(12) United States Patent
An et al.

(10) Patent No.: US 9,590,272 B2
(45) Date of Patent: Mar. 7, 2017

(54) NON-AQUEOUS ELECTROLYTE AND LITHIUM SECONDARY BATTERY USING THE SAME

(71) Applicant: LG Chem, Ltd., Seoul (KR)

(72) Inventors: Yu-Ha An, Daejeon (KR); Doo Kyung Yang, Daejeon (KR); Chul-Haeng Lee, Daejeon (KR); Young-Min Lim, Daejeon (KR); Jong-Ho Jeon, Daejeon (KR)

(73) Assignee: LG Chem, Ltd. (KR)

( * ) Notice: Subject to any disclaimer, the term of this patent is extended or adjusted under 35 U.S.C. 154(b) by 178 days.

(21) Appl. No.: 14/277,146

(22) Filed: May 14, 2014

(65) Prior Publication Data

US 2014/0242472 A1    Aug. 28, 2014

Related U.S. Application Data

(63) Continuation of application No. PCT/KR2012/009756, filed on Nov. 16, 2012.

(30) Foreign Application Priority Data

Nov. 16, 2011  (KR) .................. 10-2011-0119583
Nov. 16, 2012  (KR) .................. 10-2012-0130454

(51) Int. Cl.
| | |
|---|---|
| H01M 10/0567 | (2010.01) |
| H01M 10/052 | (2010.01) |
| H01M 10/0525 | (2010.01) |
| H01M 10/0569 | (2010.01) |
| H01M 10/0587 | (2010.01) |
| H01M 10/0568 | (2010.01) |

(52) U.S. Cl.
CPC ..... *H01M 10/0567* (2013.01); *H01M 10/052* (2013.01); *H01M 10/0525* (2013.01); *H01M 10/0569* (2013.01); *H01M 10/0568* (2013.01); *H01M 10/0587* (2013.01); *H01M 2300/004* (2013.01); *H01M 2300/0028* (2013.01); *Y02E 60/122* (2013.01); *Y02T 10/7011* (2013.01)

(58) Field of Classification Search
CPC ......... H01M 10/0567; H01M 10/0569; H01M 10/0568; H01M 10/052; H01M 10/0525; H01M 2300/0028; Y02E 60/122
See application file for complete search history.

(56) References Cited

U.S. PATENT DOCUMENTS

| | | | |
|---|---|---|---|
| 2001/0038949 A1 | 11/2001 | Hatazaki et al. | |
| 2005/0026043 A1* | 2/2005 | Kang ................. | H01M 10/052 |
| | | | 429/330 |
| 2007/0072086 A1 | 3/2007 | Nakagawa | |
| 2008/0057402 A1 | 3/2008 | Abe et al. | |
| 2011/0053003 A1 | 3/2011 | Deguchi | |
| 2012/0100436 A1 | 4/2012 | Inoue et al. | |

FOREIGN PATENT DOCUMENTS

| | | |
|---|---|---|
| EP | 2144321 A1 | 1/2010 |
| JP | 2002-148663 A | 6/1990 |
| JP | 2003-132944 A | 5/2003 |
| JP | 2003-297423 A | 10/2003 |
| JP | 2010205742 A | 9/2010 |
| JP | 2011-14476 A | 1/2011 |
| KR | 2002-0002194 A | 1/2002 |
| KR | 20050088788 A | 9/2005 |
| KR | 20110015021 A | 2/2011 |
| WO | 2004102700 A1 | 11/2004 |

OTHER PUBLICATIONS

Supplemental Search Report from European Application No. 12 85 0360, dated Feb. 26, 2015.
International Search Report for PCT/KR2012/009756 mailed on Feb. 27, 2013.

* cited by examiner

*Primary Examiner* — Laura Weiner
(74) *Attorney, Agent, or Firm* — Lerner, David, Littenberg, Krumholz & Mentlik, LLP

(57) ABSTRACT

The present invention relates to a non-aqueous electrolyte solution for a lithium secondary battery, comprising a sulfolane-based additive; and a lithium secondary battery using the same. The non-aqueous electrolyte solution for a lithium secondary battery according to the present invention comprises an ionizable lithium salt; an organic solvent; and a sulfolane compound of formula (I), the sulfolane compound being present in an amount of 0.1 to 5 parts by weight based on 100 parts by weight of the total weight of the lithium salt and the organic solvent. The non-aqueous electrolyte solution for a lithium secondary battery according to the present invention can exhibit superior storage characteristic and life cycle at a high temperature, with maintaining good output characteristic at a low temperature.

8 Claims, 2 Drawing Sheets

NON-AQUEOUS ELECTROLYTE AND LITHIUM SECONDARY BATTERY USING THE SAME

CROSS-REFERENCE TO RELATED APPLICATION

The present application is a continuation of International Application No PCT/KR2012/009756 filed on Nov. 16, 2012, which claims priority to Korean Patent Application Nos. 10-2011-0119583 and 10-2012-0130454 filed in the Republic of Korea on Nov. 16, 2011 and Nov. 16, 2012, respectively, the disclosures thereof are incorporated herein by reference.

TECHNICAL FIELD

The present invention relates to a non-aqueous electrolyte solution for a lithium secondary battery, which comprises a sulfolane-based additive, and a lithium secondary battery using the same.

BACKGROUND ART

Recently, there has been growing interest in energy storage technologies. As energy storage technologies are extended to devices such as cellular phones, camcorders and notebook PC, and further to electric vehicles, demand for high energy density of batteries used as a source of power supply of such devices is increasing. Therefore, research and development of lithium secondary batteries, which most meet the demand, are actively being conducted.

Among secondary batteries currently used, a lithium secondary battery developed in the early 1990's comprises an anode made of carbon material capable of intercalating or disintercalating lithium ions, a cathode made of lithium-containing oxide, and a non-aqueous electrolyte solution obtained by dissolving a suitable amount of lithium salt in a mixed organic solvent.

Since the use of lithium secondary batteries is extended from conventional small electronics to large-sized electronic equipments, vehicles, smart grid systems and the like, demands for a lithium secondary battery capable of maintaining its good performances under severe external conditions such as low or high temperature as well as room temperature are gradually increasing.

Conventionally, many non-aqueous electrolyte solutions have been prepared by using carbonate-based organic solvents such as ethylene carbonate (EC) and dimethyl carbonate (DMC) as a solvent for the electrolyte solutions.

However, the carbonate-based organic solvents may be decomposed on the surface of an electrode during charging and discharging processes to cause a side reaction in batteries, and solvents having large molecular weight, such as ethylene carbonate (EC), dimethyl carbonate (DMC) and diethyl carbonate (DEC) are intercalated between graphite layers in a carbon-based anode during an initial charging process, from which the structure of the anode may be degraded. Accordingly, as charging and discharging processes are repeated, the performances of lithium secondary batteries may be deteriorated.

Such a problem is known to be solved by a solid electrolyte interface (SEI) layer which is formed on the surface of an anode by the reduction of a carbonate-based organic solvent, but the SEI layer known until now is insufficient as a film for continuously protecting an anode. That is, as a surface reaction on an anode is continuously carried out, the capacity of batteries may decrease and the life characteristic thereof may be deteriorated. Also, during the formation of the SEI layer, the carbonate-based organic solvent may decompose to generate a gas such as CO, $CO_2$, $CH_4$ and $C_2H_6$, which may cause a swelling phenomenon resulting in the deterioration of batteries. The decomposition gas thus generated may deform pouch- or can-type battery assembly to cause an internal short circuit, and in severe cases, batteries may ignite or explode.

In order to overcome such problems, various additives such as vinylene carbonate, saturated sultone and unsaturated sultone have been proposed with the purpose of preventing batteries from being subject to swelling.

However, when a certain compound is added to an electrolyte solution so as to improve the performances of batteries, some properties may be improved but other properties may be reversely deteriorated. For example, in the case of vinylene carbonate, it may be decomposed prior to conventional organic solvents, thereby forming an SEI layer, however it has a problem of being easily decomposed on a cathode under the environment of a high temperature, thereby generating a gas.

Accordingly, there is a still need to develop a non-aqueous electrolyte solution capable of minimizing such problems.

DISCLOSURE

Technical Problem

The present invention is designed to solve the problems of the related art, and therefore it is an object of the present invention to provide a non-aqueous electrolyte solution for a lithium secondary battery having an improved storage characteristic and life cycle at a high temperature, as well as good output characteristic at a low temperature, and a lithium secondary battery comprising the non-aqueous electrolyte solution.

Technical Solution

In order to accomplish the above object, in accordance with one aspect of the present invention, there is provided a non-aqueous electrolyte solution for a lithium secondary battery, comprising an ionizable lithium salt; an organic solvent; and a sulfolane compound of the following formula (I), wherein the sulfolane compound is present in an amount of 0.1 to 5 parts by weight based on 100 parts by weight of the total weight of the lithium salt and the organic solvent:

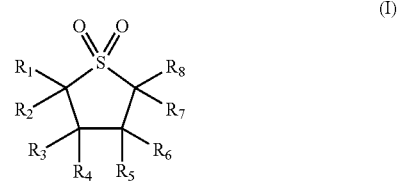

wherein,
$R_1$, $R_2$, $R_3$, $R_4$, $R_5$, $R_6$, $R_7$ and $R_8$ are each independently hydrogen, halogen, vinyl, allyl, phenyl, $C_1$-$C_{10}$ alkyl or $C_1$-$C_{10}$ alkoxy.

In the present invention, preferred examples of the sulfolane compound may include sulfolane, 2-fluoro sulfolane, 3-fluoro sulfolane, 2,3-difluoro sulfolane, 3-vinyl sulfolane, 3-allyl sulfolane, 2-methyl sulfolane, 3-methyl sulfolane, 3-ethyl sulfolane, 2,3-dimethyl sulfolane, 3-methoxy sulfolane, 3-ethoxy sulfolane and a mixture thereof, but the present invention is not limited thereto.

In the non-aqueous electrolyte solution of the present invention, the lithium salt may have any anion selected from $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2 N^-$.

In the non-aqueous electrolyte solution of the present invention, the organic solvent may be selected from the group consisting of an ether, an ester, an amide, a linear carbonate, a cyclic carbonate, and a mixture thereof.

Optionally, the non-aqueous electrolyte solution of the present invention may further comprise, as an additive for forming an SEI layer, any one selected from the group consisting of vinylene carbonate, vinyl ethylene carbonate, vinylene carbonate, fluoroethylene carbonate, vinyl ethylene carbonate, a cyclic sulfite, a saturated sultone, an unsaturated sultone, a non-cyclic sulfone and a mixture thereof.

The non-aqueous electrolyte solution of the present invention may be instantly used as a liquid electrolyte, or immersed in a polymer and then used in the form of a gel polymer electrolyte in a lithium secondary battery.

Advantageous Effects

The non-aqueous electrolyte solution according to the present invention, which comprises a sulfolane-based additive in a small amount therein, can be used in a lithium secondary battery to exhibit superior storage characteristic and life cycle at a high temperature, with maintaining good output characteristic at a low temperature.

DESCRIPTION OF DRAWINGS

Other objects and aspects of the present disclosure will become apparent from the following descriptions of the embodiments with reference to the accompanying drawings in which.

BEST MODE

Figure 1:
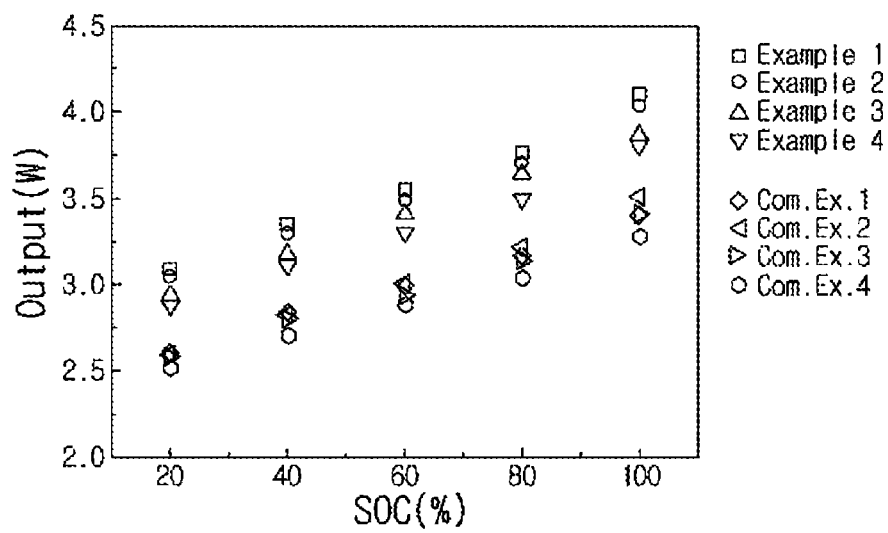
FIG. 1 is a graph showing output results of lithium batteries prepared in Examples 1 to 4 and Comparative Examples 1 to 4, which are obtained by using a voltage difference generated when they are charged with 0.5 C at −30° C. for 10 seconds, followed by discharging.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The non-aqueous electrolyte solution for a lithium secondary battery according to the present invention comprises an ionizable lithium salt; an organic solvent; and a sulfolane compound of the following formula (I), wherein the sulfolane compound is present in an amount of 0.1 to 5 parts by weight based on 100 parts by weight of the total weight of the lithium salt and the organic solvent:

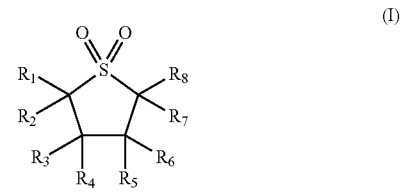

(I)

wherein, $R_1$, $R_2$, $R_3$, $R_4$, $R_5$, $R_6$, $R_7$ and $R_8$ are each independently hydrogen, halogen, vinyl, allyl, phenyl, $C_1$-$C_{10}$ alkyl or $C_1$-$C_{10}$ alkoxy.

Preferably, at least one of $R_1$, $R_2$, $R_3$, $R_4$, $R_5$, $R_6$, $R_7$ and $R_8$ is $C_1$-$C_{10}$ alkyl.

As mentioned above, an SEI layer, formed by using organic solvents or additives known in the art, is difficult to continuously maintain its performances and in particular, fails to obtain both low temperature and high temperature performances in an effective level.

However, according to the present invention, the above-mentioned sulfolane compound is used within the range presented above in an electrolyte solution, thereby exhibiting good output performances at a low temperature and simultaneously providing a substantial improvement in storage performances at a high temperature (capacity and output characteristics at room temperature after storing under the condition of a high temperature).

Preferred examples of the sulfolane compound of formula (I) may include sulfolane, 2-fluoro sulfolane, 3-fluoro sulfolane, 2,3-difluoro sulfolane, sulfolane, 3-allyl sulfolane, 2-methyl sulfolane, 3-methyl sulfolane, 3-ethyl sulfolane, 2,3-dimethyl sulfolane, 3-methoxy sulfolane, 3-ethoxy sulfolane and a mixture thereof, but the present invention is not limited thereto.

The present invention is characterized by using the sulfolane compound in an amount of 0.1 to 5 parts by weight based on 100 parts by weight of the total weight of the lithium salt and the organic solvent. If the amount of the sulfolane compound is less than 0.1 parts by weight, the improvement of output is insufficient. Also, if the amount of the sulfolane compound is greater than 5 parts by weight, gas generation may be raised during storing at a high temperature, storage and cycle performances at a high temperature may be largely deteriorated due to resistance increase, and also an output increase at a low temperature is inadequate.

According to such a light, the sulfolane compound used in the present invention may be present in an amount of preferably 0.3 to 4 parts by weight, more preferably 0.5 to 3 parts by weight in the non-aqueous electrolyte solution.

The non-aqueous electrolyte solution of the present invention comprises a lithium salt as an electrolyte salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The non-aqueous electrolyte solution comprises an organic solvent which is conventionally used in an electrolyte solution for a lithium secondary battery, for example, an ether, an ester, an amide, a linear carbonate, a cyclic carbonate, or a mixture thereof.

Among these, a linear carbonate, a cyclic carbonate, or a mixture thereof is representatively used.

The cyclic carbonate compound may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, a halide thereof and a mixture thereof. The linear carbonate compound may be any one selected from the group consisting of dimethyl carbonate (DMC), diethyl carbonate (DEC), dipropyl carbonate, ethyl methyl carbonate (EMC), methyl propyl carbonate, ethyl propyl carbonate and a mixture thereof, but is not limited thereto.

In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity.

Also, the ether which may be used as the organic solvent is any one selected from the group consisting of dimethyl ether, diethyl ether, dipropyl ether, methyl ethyl ether, methyl propyl ether, ethyl propyl ether and a mixture thereof, but is not limited thereto.

In addition, the ester which may be used as the organic solvent is any one selected from the group consisting of methyl acetate, ethyl acetate, propyl acetate, methyl propionate, ethyl propionate, γ-butyrolactone, γ-valerolactone, γ-caprolactone, σ-valerolactone, ε-caprolactone and a mixture thereof, but is not limited thereto.

The non-aqueous electrolyte solution for a lithium secondary battery according to one aspect of the present invention may further comprise an SEI layer-forming additive within a range which does not deviate from the object of the present invention. The SEI layer-forming additive which may be used in the present invention includes a cyclic sulfite, a saturated sultone, an unsaturated sultone, a non-cyclic sulfone and a mixture thereof, but is not limited thereto.

Examples of the cyclic sulfite include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite and 1,3-butylene glycol sulfite; examples of the saturated sultone include 1,3-propane sultone and 1,4-butane sultone; examples of the unsaturated sultone include ethene sultone, 1,3-propene sultone, 1,4-butene sultone and 1-methyl-1,3-propene sultone; and examples of the non-cyclic sulfone include divinyl sulfone, dimethyl sulfone, diethyl sulfone, methyl ethyl sulfone and methyl vinyl sulfone.

The SEI layer-forming additive may be used in a suitable amount depending on its specific type, for example, in an amount of 0.01 to 10 parts by weights based on 100 parts by weight of the non-aqueous electrolyte solution.

The above-mentioned non-aqueous electrolyte solution of the present invention may be instantly used as a liquid electrolyte, or immersed in a polymer and then used in the form of a gel polymer electrolyte in a lithium secondary battery.

In the case that the non-aqueous electrolyte solution of the present invention is used as a liquid electrolyte, the non-aqueous electrolyte solution is introduced in an electrode assembly consisting of a cathode, an anode and a separator interposed therebetween, thereby preparing a lithium secondary battery. The cathode, anode and separator composing the electrode assembly may be any one which is conventionally used in the preparation of a lithium secondary battery.

The cathode has a structure wherein a cathode layer comprising a cathode active material, a conductive material and a binder is immersed in one side or both sides of a current collector.

As the cathode active material, a lithium-containing transition metal oxide may be preferably used, for example, any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, O≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), $LixFePO_4$ (0.5<x<1.3) and a mixture thereof may be used. The lithium-containing transition metal oxide may be coated with a metal such as aluminum (Al) and a metal oxide. In addition, lithium-containing transition metal sulfide, selenide, or halide may also be used.

As the anode active material, a carbon-based material, a metal of lithium, silicon or tin which can conventionally intercalate and disintercalate lithium ions may be used. Also, a metal oxide, such as TiO and SnO, having a potential less than 2V to lithium may be used. Among these, the carbon-based material is preferred, and the carbon-based material may be low-crystalline carbon or high-crystalline carbon. Representative examples of the low-crystalline carbon include soft carbon and hard carbon, and representative examples of the high-crystalline carbon include natural graphite, Kish graphite, pyrolytic carbon, mesophase pitch based carbon fiber, meso-carbon microbeads, mesophase pitches, and high-temperature sintered carbon such as petroleum and coal tar pitch derived cokes.

The cathode and/or anode may comprise a binder, and various kinds of binder polymers including vinylidene fluoride-hexafluoropropylene copolymer (PVDF-co-HFP), polyvinylidene fluoride, polyacrylonitrile and polymethylmethacrylate may be used.

Also, the cathode and/or anode may further comprise a conductive material, and the conductive material is not particularly limited if it is any electron-conductive material which does not cause a chemical change in an electrochemical device. Generally, carbon black, graphite, carbon fiber, carbon nanotube, metal powders, a conductive metal oxide and an organic conductive material may be used. Examples of a commercially available conductive material include acetylene black-based products (Chevron Chemical Company or Gulf Oil Company), Ketjen Black EC-based products (Armak Company, Vulcan XC-72 (Cabot Company) and Super P (MMM Carbon Company). For example, acetylene black, carbon black and graphite may be used.

Furthermore, the separator may be obtained from a porous polymer film which is conventionally used alone or in the form of lamination in conventional separators, for example, porous polymer films made of polyolefin-based polymers such as ethylene homopolymer, propylene homopolymer, ethylene/butene copolymer, ethylene/hexene copolymer and ethylene/methacrylate copolymer. Also, as the separator, conventional porous non-woven fabrics such as a non-woven fabric made of glass fiber having a high melt point or polyethylene terephthalate fiber may be used, but the present invention is not limited thereto.

The lithium secondary battery of the present invention is not limited to its shape, but may be a cylindrical shape using a can, an angled shape, a pouch shape or a coin shape.

Hereinafter, the present invention will be explained in more detail with reference to the following Examples. However, it should be understood that the Examples are provided for the purpose of illustrations only and to better explain to a person having ordinary skill in the art, and is not intended to limit the scope of the present invention, so other equivalents and modifications could be made thereto without departing from the spirit and scope of the present invention.

Example 1

Preparation of Non-Aqueous Electrolyte Solution

Ethylene carbonate, ethyl methyl and dimethyl carbonate were mixed in a volume ratio of 3:4:3, so as to obtain an organic solvent, in which $LiPF_6$ as a lithium salt was dissolved, to obtain a solution of 1M $LiPF_6$. To the resulting solution, 1 part by weight of vinylene carbonate and 0.5 parts by weight of 3-methyl sulfolane were further added based on 100 parts by weight of the solution, to prepare a non-aqueous electrolyte solution.

<Preparation of Battery>

A mixture of $LiMn_2O_2$ and $LiNi_{1/3}Mn_{1/3}Co_{1/3}O_2$ (50:50 by wt %) as a cathode active material, polyvinylidene fluoride (PVdF) as a binder, and carbon black as a conductive material were mixed in a weight ratio of 91.5:4.4:4.1, and the mixture was dispersed in N-methyl-2-pyrrolidone, to obtain a slurry for a cathode. The slurry was coated on an aluminum current collector, followed by drying and compressing, to prepare a cathode.

Also, a mixture of natural graphite and hard carbon (90:10 by wt %) as an anode active material, carbon black as a conductive material, styrene butadiene rubber as a binder and carboxymethyl cellulose as a thickener were mixed in a weight ratio of 95.8:1:2.2:1, and the mixture was dispersed in water, to obtain a slurry for an anode. The slurry was coated on a copper current collector, followed by drying and compressing, to prepare an anode.

Then, the cathode and anode thus prepared were used together with a polyethylene separator, to assemble a pouch-type battery according to a conventional method, and the non-aqueous electrolyte solution prepared above was introduced therein, to prepare a battery.

Example 2

The procedure of Example 1 was repeated except that 3-methyl sulfolane was used in an amount of 2 parts by weight based on 100 parts by weight of the solution, to prepare a non-aqueous electrolyte solution and a battery.

Example 3

The procedure of Example 1 was repeated except that 3-methyl sulfolane was used in an amount of 3.5 parts by weight based on 100 parts by weight of the solution, to prepare a non-aqueous electrolyte solution and a battery.

Example 4

The procedure of Example 1 was repeated except that 3-methyl sulfolane was used in an amount of 5 parts by weight based on 100 parts by weight of the solution, to prepare a non-aqueous electrolyte solution and a battery.

Comparative Example 1

The procedure of Example 1 was repeated except that propane sultone was used instead of 3-methyl sulfolane, to prepare a non-aqueous electrolyte solution and a battery.

Comparative Example 2

The procedure of Example 1 was repeated except that 3-methyl sulfolane was used in an amount of 6 parts by weight based on 100 parts by weight of the solution, to prepare a non-aqueous electrolyte solution and a battery.

Comparative Example 3

The procedure of Example 1 was repeated except that 3-methyl sulfolane was used in an amount of 9 parts by weight based on 100 parts by weight of the solution, to prepare a non-aqueous electrolyte solution and a battery.

Comparative Example 4

The procedure of Example 1 was repeated except that 3-methyl sulfolane was used in an amount of 12 parts by weight based on 100 parts by weight of the solution, to prepare a non-aqueous electrolyte solution and a battery.

Test Example 1

Evaluation of Output Characteristics at a Low Temperature

Batteries prepared in Examples 1 to 4 and Comparative Examples 1 to 4 were charged with 0.5 C at −30° C. for 10 seconds and discharged. During charging and discharging, a voltage difference generated in the batteries was used to calculate the corresponding output. The results thereof are shown Table 1 and FIG. 1. The tests for each battery were carried out in the state of charge being 100%, 80%, 60% and 40%, respectively.

TABLE 1

| SOC (%) | Example 1 (W) | Example 2 (W) | Example 3 (W) | Example 4 (W) | Com. Example 1 (W) | Com. Example 2 (W) | Com. Example 3 (W) | Com. Example 4 (W) |
|---|---|---|---|---|---|---|---|---|
| 100 | 4.1001 | 4.0331633 | 3.863363 | 3.80389 | 3.4043 | 3.509848 | 3.407411 | 3.27562831 |
| 80 | 3.7634 | 3.7068118 | 3.650398 | 3.497832 | 3.1731 | 3.218396 | 3.143278 | 3.04191224 |
| 60 | 3.5467 | 3.4891654 | 3.40799 | 3.300392 | 2.9951 | 3.008707 | 2.941428 | 2.88234804 |
| 40 | 3.3441 | 3.2953978 | 3.180546 | 3.113477 | 2.8406 | 2.822973 | 2.807014 | 2.7077435 |

As shown in Table 1, the batteries of Examples 1 to 4, in which a sulfolane compound according to the present invention is used, exhibited substantially increased output characteristics at a low temperature by about 15% or more, as compared with the batteries of Comparative Examples 1 to 4.

Test Example 2

Evaluation of Discharging Capacity Characteristics at a High Temperature

Batteries prepared in Examples 1 to 4 and Comparative Examples 1 to 4 were charged at 45° C. with 1 C up to 4.2V/38 mA under the condition of CC/CV, and discharged with 2 C up to 3.03 V under the condition of CC. Then, the discharging capacity of the batteries were measured and shown in FIG. 2.

Figure 2:
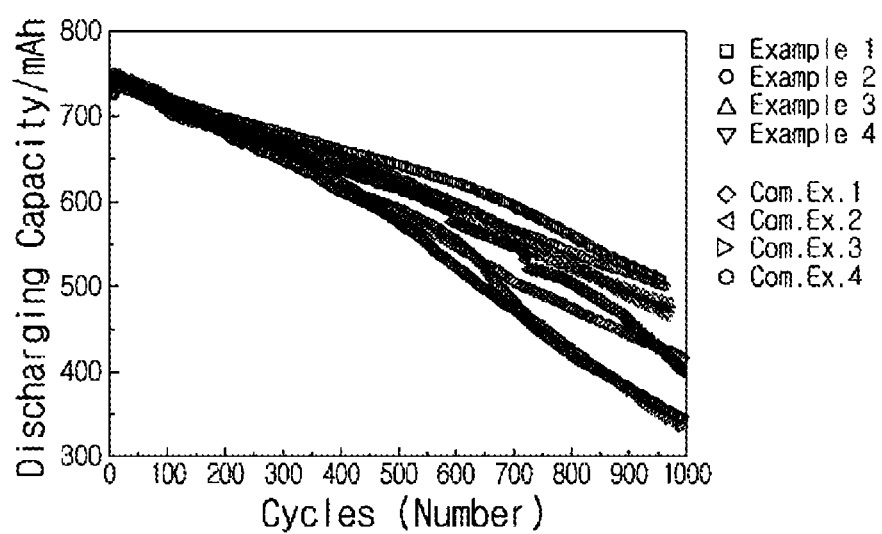
FIG. 2 is a graph showing discharging capacity results according to the number of cycles at a high-temperature for lithium batteries prepared in Examples 1 to 4 and Comparative Examples 1 to 4.

As shown in FIG. 2, the batteries of the Examples also exhibited superior cycle characteristics at a high temperature, as compared with the batteries of Comparative Examples 1 to 4.

Test Example 3

Evaluation of Storage Characteristics at a High Temperature

Figure 3:
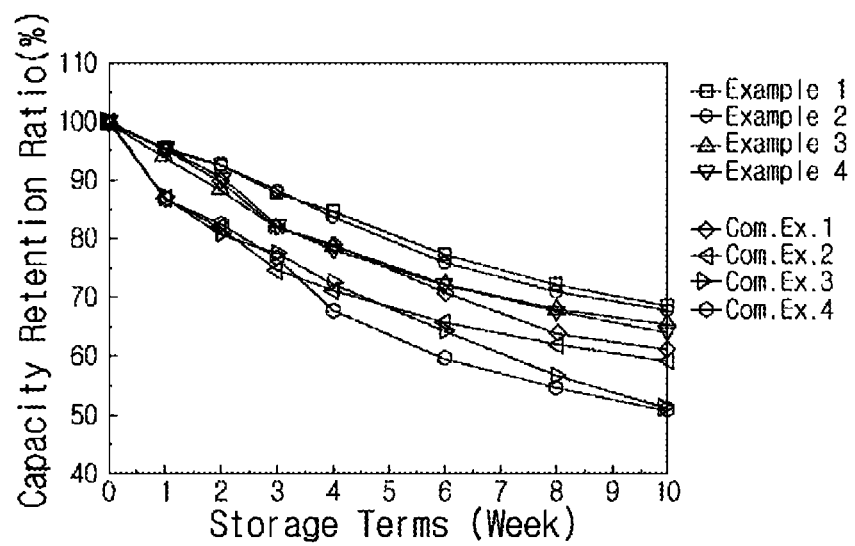
FIG. 3 is a graph showing capacity retention ratio results depending on storage terms while storing at a high-temperature for lithium batteries prepared in Examples 1 to 4 and Comparative Examples 1 to 4, the measurement of the capacity retention ratio being carried out at room temperature.
Figure 4:
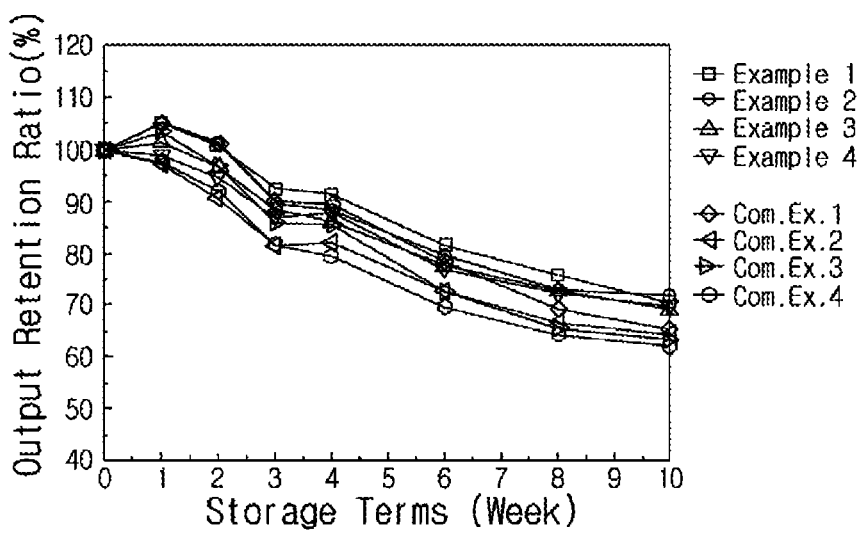
FIG. 4 is a graph showing output retention ratio results depending on storage terms while storing at a high-temperature for lithium batteries prepared in Examples 1 to 4 and Comparative Examples 1 to 4, the measurement of the output retention ratio being carried out at room temperature.

Batteries prepared in Examples 1 to 4 and Comparative Examples 1 to 4 were stored at a high-temperature (60° C.) and their capacities and outputs were measured depending on storage terms at room temperature, and the results thereof are shown in FIGS. 3 and 4. Specifically, the batteries to be evaluated were stored in an oven set to 60° C., and taken out from the oven for evaluation, followed by measuring at room temperature, and then again stored in the oven set to 60° C.

(1) Measurement of Capacity at Room Temperature after Storing at a High Temperature Batteries were charged at room temperature with 1 C up to 4.2V/38 mA under the condition of CC/CV, and discharged with 1 C up to 3.03 V under the condition of CC. Then, the discharging capacity of the batteries was measured, and the retention ratio results thereof are shown in FIG. 3.

From FIG. 3, it was confirmed that the longer the storage term at high temperature, a difference between the discharging capacities of the Examples and Comparative Examples increases, and also the batteries of the Examples exhibited superior discharging capacity retention ratio at room temperature, i.e., about 10% greater than those of Comparative Examples.

(2) Measurement of Output at Room Temperature after Storing at a High Temperature Batteries were charged with 5 C for 10 seconds and discharged. During charging and discharging, a voltage difference generated in the batteries was used to calculate the corresponding output under SOC of 50%. The retention ratio results thereof are shown FIG. 4.

From FIG. 4, it was confirmed that the longer the storage term at high temperature, a difference between the output retention ratios at room temperature of the Examples and Comparative Examples increases, and also the batteries of the Examples 1 to 4 exhibited superior output retention ratio at room temperature, i.e., about 8% greater than those of Comparative Examples 1 to 4.

What is claimed is:

1. A non-aqueous electrolyte solution for a lithium secondary battery, comprising an ionizable lithium salt; an organic solvent; a sulfolane compound; and any one selected from the group consisting of vinylene carbonate, vinyl ethylene carbonate, fluoroethylene carbonate, a cyclic sulfite, a saturated sultone, an unsaturated sultone, a non-cyclic sulfone and a mixture thereof, wherein the sulfolane compound is present in an amount of 0.1 to 0.5 parts by weight based on 100 parts by weight of the total weight of the lithium salt and the organic solvent, wherein the sulfolane compound is any one selected from the group consisting of 2-fluoro sulfolane, 3-fluoro sulfolane, 2,3-difluoro sulfolane, 3-vinyl sulfolane, 3-allyl sulfolane, 2-methyl sulfolane, 3-methyl sulfolane, 3-ethyl sulfolane, 2,3-dimethyl sulfolane, 3-methoxy sulfolane, 3-ethoxy sulfolane and a mixture thereof.

2. The non-aqueous electrolyte solution for a lithium secondary battery according to claim 1, wherein the lithium salt has an anion selected from $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N$.

3. The non-aqueous electrolyte solution for a lithium secondary battery according to claim 1, wherein the organic solvent is selected from the group consisting of an ether, an ester, an amide, a linear carbonate, a cyclic carbonate, and a mixture thereof.

4. The non-aqueous electrolyte solution for a lithium secondary battery according to claim 3, wherein the cyclic carbonate is selected from the group consisting of ethylene carbonate, propylene carbonate, 1,2-butylene carbonate, 2,3-butylene carbonate, 1,2-pentylene carbonate, 2,3-pentylene carbonate, a halide thereof and a mixture thereof.

5. The non-aqueous electrolyte solution for a lithium secondary battery according to claim 3, wherein the linear carbonate is selected from the group consisting of dimethyl carbonate, diethyl carbonate, dipropyl carbonate, ethyl methyl carbonate, methyl propyl carbonate, ethyl propyl carbonate and a mixture thereof.

6. The non-aqueous electrolyte solution for a lithium secondary battery according to claim 3, wherein the ether is selected from the group consisting of dimethyl ether, diethyl ether, dipropyl ether, methyl ethyl ether, methyl propyl ether, ethyl propyl ether and a mixture thereof.

7. The non-aqueous electrolyte solution for a lithium secondary battery according to claim 3, wherein the ester is selected from the group consisting of methyl acetate, ethyl acetate, propyl acetate, methyl propionate, ethyl propionate, γ-butyrolactone, γ-valerolactone, γ-caprolactone, σ-valerolactone, ϵ-caprolactone and a mixture thereof.

8. A lithium secondary battery comprising an electrode assembly consisting of a cathode, an anode and a non-aqueous electrolyte solution,
   wherein the non-aqueous electrolyte solution is the non-aqueous electrolyte solution for a lithium secondary battery according to claim 1.

* * * * *